(12) United States Patent
Guyer et al.

(10) Patent No.: US 11,193,691 B1
(45) Date of Patent: Dec. 7, 2021

(54) CONTROLLER FOR HEATING SYSTEM DIAGNOSTICS AND OPERATION

(71) Applicant: Yankee Scientific, Inc., Medfield, MA (US)

(72) Inventors: Eric C. Guyer, Dover, MA (US); Mark J. Macaulay, Northborough, MA (US)

( * ) Notice: Subject to any disclaimer, the term of this patent is extended or adjusted under 35 U.S.C. 154(b) by 0 days.

(21) Appl. No.: 16/811,053

(22) Filed: Mar. 6, 2020

(51) Int. Cl.
| | |
|---|---|
| F24F 11/65 | (2018.01) |
| F24D 19/10 | (2006.01) |
| G05B 13/02 | (2006.01) |
| F24F 11/46 | (2018.01) |
| F24F 140/50 | (2018.01) |
| F24F 140/60 | (2018.01) |

(52) U.S. Cl.
CPC .......... *F24F 11/65* (2018.01); *F24D 19/1063* (2013.01); *F24F 11/46* (2018.01); *G05B 13/026* (2013.01); *G05B 13/0245* (2013.01); *G05B 13/0255* (2013.01); *F24D 2220/0271* (2013.01); *F24D 2220/042* (2013.01); *F24F 2140/50* (2018.01); *F24F 2140/60* (2018.01); *F24F 2221/183* (2013.01); *G05B 2219/2614* (2013.01); *G05B 2219/2639* (2013.01)

(58) Field of Classification Search
CPC .. F24F 11/62; F24F 11/63; F24F 11/64; F24F 2110/10; F24F 11/65; F24F 2140/60; F24F 2110/12; F24F 11/54; F24F 11/84; F24F 2140/05; F24F 2221/183; F24D 19/1048; F24D 19/1063; F24D 2220/0271; G05B 2219/2614; G05B 19/042; G05B 2219/36249; G05B 13/0265; G05B 13/021; G05B 23/0235; G05B 2219/2639

See application file for complete search history.

(56) References Cited

U.S. PATENT DOCUMENTS

| | | | | | |
|---|---|---|---|---|---|
| 4,134,544 | A | * | 1/1979 | Thomason | ............ F24D 11/003 126/585 |
| 4,412,581 | A | * | 11/1983 | Iversen | ...................... F24D 3/18 165/240 |
| 2008/0083403 | A1 | * | 4/2008 | King | ................... F24D 19/1015 126/344 |
| 2013/0248609 | A1 | * | 9/2013 | Aspeslagh | .......... F24D 19/1039 237/8 A |

* cited by examiner

*Primary Examiner* — Atif H Chaudry
(74) *Attorney, Agent, or Firm* — Loginov & Associates, PLLC; William A. Loginov

(57) ABSTRACT

This invention provides an electronic control for combination (fuel-fired boiler and electric heat pump) building space and water heating systems that optimizes operation of such within the operating temperature limits and heat capability of both the heat pump and boiler unit in the combination system. In a diagnostic mode, the controller assesses the ability of existing heat radiation systems in thermostatically controlled zones to meet heating loads at different operating temperature limits of the heat pump and boiler. The system/controller provides information to guide most effective deployment of system heat-dissipation devices. In its normal operating mode, the controller is capable of receiving input signals from zone thermostats, the boiler and heat pump, along with current outdoor temperature and other data, processing and evaluating inputs over time, and outputting control signals. The controller facilitates use of a combined heat pump and boiler heating system with minimum equipment, installation, and operational cost.

21 Claims, 7 Drawing Sheets

| FRACTIONAL "ON-TIME" OUTPUT FROM CONTROLLER DIAGNOSTIC OPERATION | | | | | | | | |
|---|---|---|---|---|---|---|---|---|
| OUTDOOR TEMPERATURE BINS (F) | 70 TO 60 | 60 TO 50 | 50 TO 40 | 40 TO 30 | 30 TO 20 | 20 TO 10 | 10 TO 0 | 0 TO -10 |
| ZONE 1 | 0.10 | 0.15 | 0.25 | 0.35 | 0.45 | 0.65 | 0.78 | 0.9 |
| ZONE 2 | 0.05 | 0.13 | 0.20 | 0.30 | 0.40 | 0.58 | 0.65 | 0.8 |
| ZONE 3 | 0 | 0.10 | 0.15 | 0.20 | 0.30 | 0.40 | 0.45 | 0.5 |
| ZONE 4 | 0 | 0.10 | 0.20 | 0.40 | 0.51 | 0.70 | 1.0 | 1.0 |

FIG. 2

| PREDICTED FRACTIONAL "ON-TIME" WITH OPERATION WITH HEAT PUMP ONLY | | | | | | | | |
|---|---|---|---|---|---|---|---|---|
| OUTDOOR TEMPERATURE BINS (F) | 70 - 60 | 60 - 50 | 50 - 40 | 40 - 30 | 30 - 20 | 20 - 10 | 10 - 0 | 0 - (-10) |
| ZONE 1 | 0.19 | 0.28 | 0.47 | 0.66 | 0.84 | 1.22 | 1.46 | 1.69 |
| ZONE 2 | 0.09 | 0.24 | 0.37 | 0.56 | 0.75 | 1.09 | 1.22 | 1.50 |
| ZONE 3 | 0 | 0.19 | 0.27 | 0.37 | 0.56 | 0.75 | 0.84 | 0.94 |
| ZONE 4 | 0 | 0.19 | 0.37 | 0.75 | 0.95 | 1.31 | 1.88 | 1.88 |

BINS WITH FRACTIONAL ON-TIMES LESS THAN 1.0 (100%) ARE SHADED.
BINS WITH FRACTIONAL ON-TIMES NOT ADEQUATELY HEAT BY HEAT PUMP ARE NOT SHADED.

FIG. 4

| EXAMPLE ANNUAL RELATIVE HEATING LOAD AS A FUNCTION OF THE OUTDOOR TEMPERATURE | | | | | | | | |
|---|---|---|---|---|---|---|---|---|
| OUTDOOR TEMPERATURE BINS (F) | 70 TO 60 | 60 TO 50 | 50 TO 40 | 40 TO 30 | 30 TO 20 | 20 TO 10 | 10 TO 0 | 0 TO -10 |
| RELATIVE HEATING DEMAND | .125 | .25 | .375 | 0.5 | 0.625 | 0.75 | 0.875 | 1.0 |
| DURATION AT BIN TEMPERATURE RANGE (HOURS) | 400 | 600 | 1100 | 1200 | 1200 | 400 | 300 | 150 |
| ANNUAL RELATIVE HEATING LOAD | 50 | 150 | 412 | 600 | 750 | 300 | 262 | 150 |
| PERCENTAGE OF ANNUAL HEATING LOAD | 1.8% | 5.6% | 15% | 22% | 28% | 11% | 10% | 5.6% |

FIG. 6

CONTROLLER FOR HEATING SYSTEM DIAGNOSTICS AND OPERATION

FIELD OF THE INVENTION

This invention relates to controllers for heating systems, and more particularly to heat pump controllers.

BACKGROUND OF THE INVENTION

Heat pumps, especially those powered by electricity, are seen as an avenue to the decarbonization of space and water heating in buildings. Instead of burning fossil fuel for heating, which produces carbon dioxide emissions, use of a heat pump powered by electricity can have environmental advantages if the electricity is produced with low carbon emissions (e.g. wind and/or solar energy), and because the electric energy used by the heat pump produces heating energy by drawing heat from the ambient environment or from a large source of stable temperature—such as ground water.

Heat pumps, however, have operating limitations compared to traditional fossil-fired heating equipment with respect to temperature of the delivered heat. This is a significant limitation when applying air source heat pumps to existing buildings having heat distribution systems that were designed for use with traditional fossil fueled heating boilers. Heating with boilers involves distribution heat energy by the circulation of water to either "radiators," that transfer heat to the air in the building via direct convection/radiation, and/or with the assistance of forced air, passed over a heat exchange structure, such as metal fins; or to domestic water heaters. Heat pumps that can be applied to water-circulation heating systems are generally referred to as air-to-water or water-to-water heat pumps, depending on the source of the environmental heat. Traditionally, so-called "forced hot water", or "hydronic", heating systems were designed to supply hot water temperatures of about 180 to 200 F during very cold weather. Because of basic thermodynamic considerations related to the vapor compression cycle used in heat pumps, the maximum heated water supply temperature of heat pumps can be only 140 F or lower. Using a heat pump to completely replace an existing boiler can be a challenge because, at the lower water temperature that can be produced by the heat pump, there may not be a sufficient amount of heat delivery capacity (so-called "radiation") to heat the building during very cold outdoor temperatures. Radiators of the several types used in hydronic heating systems dissipate heat approximately in proportion to the difference between the supplied hot water temperature and the room air temperature. Thus, reducing the supplied water temperature, as may occur with heat pump when applied to an existing system, can reduce the heating capacity by up to about one half of the original heating capacity (i.e. 200 F-70 F versus 140 F-70 F). Another disadvantage to currently available heat pump systems as replacements for traditional fossil fueled boilers, in addition to the supply temperature problem, is that the heating capacity and the efficiency of heat pumps decreases significantly at low outdoor temperatures of about 0 F compared to their heating capacity and efficiency at a 40 F outdoor temperature. Thus, the size of the heat pump unit needed to meet cold weather conditions can be large, even though it operates most of the time in more moderate outdoor temperature conditions. Fuel-fired boilers are generally free of this limitation of decreasing heating capacity at low outdoor temperatures. The temperature, capacity, and efficiency limits of heat pumps, especially in the case of the application to an existing building with an existing heat delivery system, can be avoided if an air-to-water heat pump is used as a supplement to a fossil-fuel fired boiler and such a combination can achieve much of the desired environmental and operating cost benefit associated with use of heat pumps. In such systems the heat pump size can be smaller, and thus less expensive, and primarily operated except during the limited periods of very cold weather when the total heating demand is high. In such combined systems, the fossil-fuel boiler operates as essentially a cold weather back up system to the heat pump. Depending on the heat pump's operating characteristics, the heat pump in such a combination system may not operate at all during very low outdoor temperature conditions.

The challenge in applying a heat pump in combination with a fossil-fuel fired boiler involves several issues, especially recognizing that such forced hot water heating systems may be composed of a number of heating zones, each separately controlled by a thermostat in each separate zone. The fundamental issue is achieving most beneficial use of the heat pump with its supply water delivery temperature limitation and outdoor-temperature-dependent operating efficiency. The ideal control system for such a combined system will operate such as to produce the desired objective of sustained thermal comfort (or meeting domestic hot water demand) at all times while also meeting the desire for minimum annual cost of operation of the system or minimum carbon emissions (including fossil fuel burning at the building site and that occurring remotely in the production of the consumed electric power). This is a complex control problem and, to date, there have been no commercially available products that are specifically designed to meet the control challenge of such combined systems.

Part of the challenge of achieving optimum design and control of such a combined heat pump and fuel-fired boiler system, especially when applied to an existing building with an existing heat distribution system that was originally deployed with a fossil fuel fired boiler, is that there is usually poor understanding of the capacity of the existing radiation system to deliver the required amount of heat for that particular zone given the heat supply temperature limits of a heat pump. Any heating zone with a large amount of heat dissipation capacity can quickly meet a call for heat from the room thermostat and thus the length of the "call for heat" will be smaller when compared to the length of the call for heat if the zone has a limited amount of heat dissipation capacity. While presumably all zones in any existing system originally deployed with a fossil fueled boiler having relatively high heat delivery temperature, for example 180 to 200 F, can satisfy, in reasonable time, the heating demands for all zones under all weather conditions, it is not easy to determine, by inspection, how well a zone might function with the lower heat delivery temperature of a heat pump. Heating loads may have increased or decreased since the original system installation as building envelope improvements to older buildings has been a common practice. Such improvements can include additional/updated insulation, siding, vapor barriers, etc. All that is typically known is that system does meet the heating demand in all zones, but it is not known what the actual duty-cycles of the heat dissipation devices are in the different zones. Duty cycle would be the fraction of time there is a call for heat by the room thermostat at a particular heating demand situation, which is largely driven by the outdoor temperature. Thus, by simple inspection of an existing heating system it is very difficult to predict the performance of a heat pump added in combination with a fossil-fueled boiler for an existing heating system. It can be uncertain as to what comprises the preferred control logic relative to zone heating demands with the limited information about the existing radiation system without performing detailed analysis of both heat loads in each zone and the performance characteristics of the existing heat dissipation devices, such as baseboard radiator and panel heaters, in each zone. Also, the comfort level expectations and thermostat "set back" schedules can come in to play in making a judgement how a heat pump might best function in such a combined system. Accordingly, the application of heat pumps to existing hydronic heating systems designed for use with fuel-fired boilers has been limited and, when done so, has been performed in a manner that can result in poor utilization of the heat pump, poor comfort control, poor operating economy, low environmental benefits, over- or under-sized heat emitters and other excessive equipment costs. This stems from the practical need to make very conservative design assumptions about the existing radiation system and its ability to function with the lower supply temperature of the heat pump. Installers of heating systems dread the future compliant that the new heating system they have installed for a customer does not provide the desired thermal comfort, so the inclination is to specify more, and oversized, equipment that is not actually necessary or cost justified. This has always been a well-known, and often justified, inclination of the sellers and installers of the heating system, but in the case of heat pump systems these inclinations can have even greater negative impacts on equipment costs, installation costs, and system operating costs. The fact that there are usually several heating zones in an existing system, each operating independently and each having its own heat dissipation characteristic, only further complicates the efficient deployment of heat pumps in combination with fuel-fired boilers, especially in existing building with existing radiation systems.

A further complication in the application of heat pumps in conjunction with boilers is that, in many if not most cases, simultaneous operation of a heat pump and boiler will not be possible without major heat distribution system redesign and rebuild. This stems from the fact that the temperature drop in the heat distribution system with traditional design practices is relatively small, on the order of 10 to 20 Fahrenheit degrees. Thus, it is not (typically) possible to operate a heat pump with say a 130 F supply temperature limit simultaneously with a boiler operating at a 180 F operating supply temperature (and say a 160 F return temperature). Neither a simple series, nor parallel piping arrangement, of the heat pump and boiler in the primary heating water supply that is distributed to the different heating zones can allow for simultaneous operation of the boiler, at its normal operating temperature, and the heat pump, without the heat pump exceeding its operating temperature limits. Thus, application of heat pumps with boilers, in order to take benefit of the higher operating temperature of the boiler, that is advantageous in cold weather conditions, generally includes mechanical system configurations and controls that only allow operation of either the boiler or heat pump unit at any given time. A complex mechanical and control scheme is theoretically possible to allow such simultaneous operation, but cost may be prohibitive. Low-cost for installation of systems using a heat pump with a boiler can be achieved only if additional piping and water flow controls needed to service the multiple heating zones, beyond those normally employed with a boiler-only system, can be kept to a minimum.

SUMMARY OF THE INVENTION

This invention overcomes disadvantages of the prior art by providing an efficient system and method for the application and operation of a heat pump unit in combination with a fuel-fired heating boiler unit for the purpose of building space heating and domestic water heating with forced-hot-water, or so-called hydronic, heating systems that circulate water for heat distribution. Such combination systems are desirable to meet the normally highly variable space heating, and water heating, loads with the best (most efficient) use of the fuel-fired heat boiler and heat pump units to achieve specific operating objectives such as achieving minimum fuel use, minimum operating cost, or minimum carbon emission while simultaneously maintaining thermal comfort and meeting water heating demands among the several heating zones served by the combination heating system. The illustrative system and method provide an electronic control device that optimizes the operation of such a combination system within the operating temperature limits and heat capability of both the heat pump and boiler unit in the combination system. In a diagnostic mode of operation, the controller can assess the ability of an existing heat radiation system of many separate thermostatically controlled zones to meet heating loads at the different limits of the heated water temperatures that can be achieved by the heat pump and the boiler. Further, the system and method, and its associated controller, can provide information to guide the most effective deployment of heat dissipation devices with the system. In its normal (runtime) operating mode, the controller is capable of receiving input signals from (e.g.) zone thermostats, the boiler, and the heat pump, along with input data about current outdoor temperature and other input data, processing and evaluating these inputs over time, and outputting control signals to the heating zone control devices, the fuel-fired heating boiler, and the heat pump. Use of the controller facilitates the deployment of a heat pump in conjunction with a fuel-fired boiler at minimum equipment, installation, and operational cost and will be especially useful in application of heat pumps in buildings with existing multi-zone hydronic heat distribution systems.

In an illustrative embodiment, an electronic controller for the operation of a building space and domestic water heating system employing the pumped circulation of a heated liquid is provided. The system includes a heat supply sources with different liquid temperature operating limits and heating capacities and thermostatically-controlled heat delivery zones containing heat delivery devices. The controller further operates/includes a diagnostic process adapted to record and analyze, over time, an operating history of thermostatic controls for the heat delivery zones and the heat supply sources to thereby determine (i) a liquid-temperature-dependent heat delivery capacity of the heat delivery devices contained in each of the heat delivery zones, respectively and (ii) other useful operating information. It also operates/includes a runtime process that, based on the determining of (i) and (ii) enables and executes overall operational control of the heating system in the satisfaction of heating demands of the heat delivery zones within the different liquid operating temperature limits and heating capabilities of the heat sources. In this manner, the operational control achieves substantially minimum fuel use, substantially minimum cost of operation, and/or other desired operating goals for the system. Illustratively, the input signals to the controller include an operating status of each of the thermostatic controls relative to an occurrence or non-occurrence of heating demand in each zone, respectively. One of the input signals to the controller can include outdoor temperature, provided either by direct measurement or communication with a weather data provider. The controller can include a process to determine when enough operating data has been recorded during a diagnostic period to allow for efficient operation of both the boiler and the heat pump in a normal runtime mode to meet operational objectives. The system can further include a manual, automatic, or remote-operated override to the controller's operating processes that optimize operation of the combined heating system to allow for response to special circumstances.

In another illustrative embodiment, an electronic controller for the operation of a combined heating system that includes a heat pump and a boiler for building-space and domestic-water heating, which has one or more thermostatically-controlled heating zones that are supplied with heated liquid and contain heat delivery devices is provided. The electronic controller operates/includes a diagnostic process that records and analyzes, over time, an operating history of thermostatic controls of each of the heating zones to determine (i) a liquid-temperature-dependent heat delivery capacity of the heat delivery devices contained in each of the zones, respectively, and (ii) other useful information. The controller further operates/includes a runtime process that, based on the determining of (i) and (ii) enables and executes overall an overall operational control of the system in the satisfaction of heating demands of the heating zones within different operating temperature limits and heating capabilities of the heat pump and the boiler. In this manner, the operational control achieves substantially minimum fuel use, substantially minimum cost of operation, and/or other desired operating goals for the system. Illustratively, the combined heating system includes a boiler that is a fuel-fired water heating boiler or an electric resistance heating boiler. The combined heating system can include a heat pump, or heat pumps, that are powered by either heat or electricity and use environmental heat energy from the ground, local water supplies, or air, and further comprising a thermal storage buffer tank to facilitate operation of the heat pump. The input signals to the controller can include an operating status of each of the thermostatic controls relative to an occurrence or non-occurrence of heating demand in each zone, respectively. An input signal to the controller can include outdoor temperature, provided either by direct measurement or communication with a weather data provider. The controller can be constructed and arranged to (a) signal at least one of the heat pump and the boiler to operate to produce heat at a specific level of heat output, and to (b) signal operation of any pump or motorized valve associated directly with the flow of fluid in either the heat pump or the boiler. The information input to the controller can include the set point temperature of the boiler and a maximum and/or a set point operating outlet temperature of the heat pump. The data input to the controller can include (a) a continuous input of the output, input, or both output and input water temperatures of the heat pump, and/or (b) an output, input, or both output and input, water temperature of the boiler. The system can further include control output features that are adapted to operate the combined heating system, in which the heat pump and the boiler are configured in series flow arrangement or parallel flow arrangement with respect to a primary circuit of heated liquid supply and return piping that collectively services the thermostatically controlled heating zones. During operation of the diagnostic process, the controller can be adapted to operate the combined heating system, over a period of time, with only the boiler as the heat source to meet heating demands. In this manner, the controller collects data on the time behavior of thermostats in the thermostatically-controlled zones and the operating behavior of the boiler, so as to determine an ability of existing of the heat delivery devices to meet heating demand at temperatures other than a current set point temperature of the boiler. Based on the recorded and analyzed operating history of the thermostats in one or more of the heating zones, the controller can be adapted to output (a) a desired operating set point temperature and/or (b) an operating command to either, or both, the heat pump and the boiler, so as to maximize operating energy efficiency of the combined heating system. Illustratively, the controller is adapted to monitor temperatures present in the heating zones so as to make adjustments to operating schedules of the heat pump, boiler, and/or heating zones that achieve the desired operating objective while providing acceptable thermal comfort. In this manner, operation of the boiler is substantially minimized and operation of the heat pump is substantially maximized, so that operational cost and/or carbon emissions are substantially minimized. The controller can be adapted to use recorded operating history of the heating zones to determine periods of thermostat set-back and to facilitate operation of the heat pump, so as to minimize the use of the boiler and maximize the use of the heat pump during the operation of the heating system to recover zone room temperatures to a normal, and higher and non-setback, temperature. The controller can be adapted to output information that includes a printed output and/or a displayed output, that provides information related to (a) operating history of the heating zones, (b) sizing or performance of the heat dissipation devices in each zone, (c) operating history of the heat pump and the boiler, and/or (d) a current operational status of the combined heating system. The controller can be adapted to display, on an interface, easily understood, user-friendly trim control features that allow for the building occupant to adjust the control parameters or logic, within limited ranges, in response to building occupant dissatisfaction with performance in maintaining comfort control as are experienced, while the controller functions to achieve operational objectives such as minimum fuel use by the boiler or lowest operational cost. The controller can be adapted to interoperate with conventional, on-off room thermostats and/or electronic digital communicating thermostats. Also, the controller can be adapted to interoperate with heating zones using valves and/or pumps for heating fluid flow control. Illustratively, the controller operates/includes a process to determine when enough operating data has been recorded during a diagnostic period to allow for effective operation of both the boiler and the heat pump in a normal runtime mode to meet operational objectives. The system and further provide a manual, automatic, and/or remote-operated override to the controller's operating processes that optimize operation of the combined heating system to allow for response to special circumstances. Moreover, the controller can be adapted to record an operating history of the boiler, when used as the sole source of heating, so as to allow evaluation and estimation of appropriate sizing of a heat pump to be added, or used in combination with, with the boiler to meet demands of the combined heating system.

In another illustrative embodiment, a method of measuring the behavior, over time, of a thermostat in a single heating zone, or thermostats in multiple heating zones, of a circulated-hot-water type of space and domestic water heating system containing heat sources with different supply water operating temperatures is provided. The method determines, over a range of outdoor temperatures and at a known heating system supply water temperature, heat delivery capacity in each of the heating zones relative to a thermal load in each of the zones, respectively. This allows a measured fractional time of active heat demand by the thermostat in each of the zone, respectively, to be interpreted as the capacity of a zone to meet the heating load at the known heating system supply water temperature at the current outdoor temperature. The method predicts, in response to the above determination, zone operating behavior at other supply heating water and outdoor temperature conditions. In this manner, scheduling of the use of the different heat sources having different operating temperature limits and heating capability is established to achieve desired operational objectives, including minimum fuel use, minimum cost, and/or other performance optimizations.

BRIEF DESCRIPTION OF THE DRAWINGS

The invention description below refers to the accompanying drawings, of which:

FIG. 2 is a chart showing exemplary values for fractional "on-time" output from operation of diagnostic mode by the controller of FIG. 1;

FIG. 4 is a chart showing predicted fractional "on-time" with operation of the heat pump exclusively in association with the system of FIG. 1;

FIG. 6 is a chart showing exemplary annual relative heating load as a function of the outdoor temperature for use in programming the controller of FIG. 1.

DETAILED DESCRIPTION

I. Controller Overview

The exemplary embodiment herein provides an electronic controller that is adapted to solve the complex problem of achieving the optimum deployment and operation of a heat pump in combination with a fuel-fired boiler. Uniquely, the controller has both a diagnostic mode of operation and a normal (runtime) mode of operation. The diagnostic mode is used to assess the heat dissipation capacity that exists in the different zones relative to the heat demands present in the different zones. Then, with this information, the illustrative controller can provide information to enable the proper sizing of the heat pump, allow optimum scheduling of the heat pump and boiler operation, and, if so desired, guide the optimum deployment of additional heat dissipation capacity (i.e. "radiators") as may be needed or desired. After operation in the diagnostic mode, the controller then functions to actually operate the system in a manner that is superior to that achievable by conventional control systems for multi-zone hydronic heating systems. The controller can be installed before the installation of the heat pump to develop the needed diagnostic information as it operates over a period of time in the diagnostic mode and then later enabled to operate in actual control of the complete combined heating system, including the heat pump. The invention contemplates that all these functions of the invention would be physically included in one self-contained unit or would be composed in one part to be first installed that has strictly diagnostic capability to which, at a later time, a system operating part is added with completion of the heat pump installation, without (free of) removal of the initially installed part. The controller, in addition to single heat pump and boiler combination heating systems as described, is also applicable to heating systems with any number and combination of heating devices having different operating temperature limits and also has use as a diagnostic tool to gather operating characteristics of non-performing hydronic systems.

Figure 1:
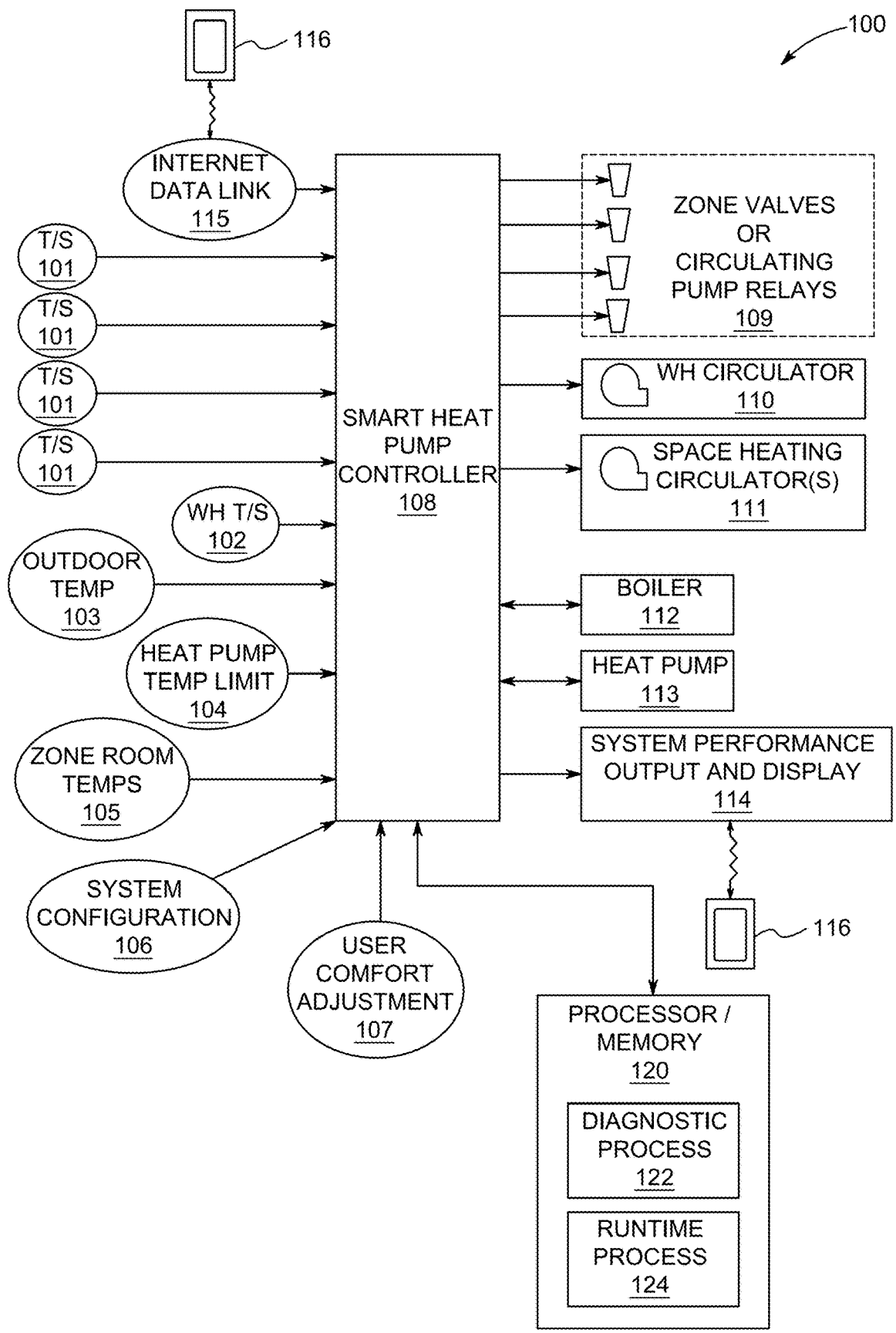
FIG. 1 is schematic diagram showing an overview of a combined hydronic and heat-pump based heating system with an illustrative controller and interconnected components, according to an illustrative embodiment.

Reference is made to the system 100 shown in FIG. 1, which details the configuration of the inputs and outputs of the "smart" controller invention 108 as shown in FIG. 1. Arrows denote the illustrative direction of data or signal flow. The controller 108 functions with the continuous input of the heat demand signals from the different zone thermostats 101 (including a water heater loop sensor 102), and the input of current outdoor temperature (via an appropriate outdoor sensor probe 103), certain temperatures within the heating system, and the operating status of the heating equipment (i.e. is in a heat generating mode or not, for example). The controller's initial installer setup also provides for the input of the heat pump and boiler operating characteristics (configuration information 106 in an appropriate alphanumeric format) and operating temperature limits 104. Also, inputs can include user-friendly adjustments that allow the building occupant (or another interested party) to adjust the operation of the controller 108 to meet their comfort preferences 107, and respond to concerns about the adequacy of comfort control they are experiencing. More particularly, data regarding the real time room temperatures 105 in each zone 105 can be input to the controller 108.

The controller outputs include signals for operation of the boiler 112 and/or heat pump 113, and operation of the heat zone control devices, normally zone valves 109 and circulator pumps, for delivery of heat to each of the different heating zones (i.e. including water heating water circulator pumps 110 and space heating water circulator pump 111). The controller 108 can also provide output regarding the duty cycle of each of different zones to assist in determination of the best locations and size of potential additional heat dissipation capability amongst the different heating zones. This information 114 can be displayed via a fixed display screen associated with the controller, or a removable (e.g. smartphone, laptop tablet), networked (e.g. wired/wireless data link 115) computing device 116. Such computing device 116 can be used to input various settings and other parameters used to control the system as shown on the "input" side of the controller 108.

The controller 108 can be implemented as hardware, software (including non-transitory program instructions), firmware or a combination thereof. The controller can be integrated with the housing of the heat pump or other HVAC component, or can be provided in a separate add-on module that is either provided as an OEM feature, or an after-market add-on to a heating system. As shown, the processor/processing functionality 120 can be (e.g.) any acceptable microcontroller, microprocessor, FPGA or ASIC, or combination thereof, and can include appropriate working and program memory(ies). Various analog/digital interfaces and associated analog components can also be associated with the processor to receive and output (as appropriate) varying voltage and/or current that is employed by system peripherals—e.g. thermostats, sensors, valves, etc. The process(or) 120 can be divided generally into diagnostic processes 122, which are adapted to operate in the diagnostic mode (described further below), and normal or runtime processes 124, which govern general operation of the controller and/or are focused on runtime operation (also described further below).

II. Controller Diagnostic Mode

A. Overview

For the diagnostic mode application of the controller 108, the installation entails connecting the controller to monitor the operating status of each of the heating zones (such as 109), the outdoor temperature (103), the operating status of the existing boiler (i.e. burner "on" or "off") and heating supply temperature as produced by the existing heating boiler, before addition of the heat pump. Monitoring of the operating status, while operating in this boiler-only mode, entails recording of the time behavior of each, and all, heating zones, with respect to its "on" and "off" status as determined by "call for heat" action of the thermostat 101 in that particular zone. In this diagnostic mode, the controller 108 does not actually determine the on and off behavior of the heating zones. In this mode, the operating behavior of the heating zones, as is the normal case with conventional zoned heating systems, is controlled by the room thermostats 101 in each zone.

Conventional practice is for the heating zones, in boiler systems of the size typically used in residences and other buildings, to be operated in only an "on" or "off" mode and true proportional control of heating supply is not generally practiced. Thus, the data is to be collected and stored by the illustrative controller during the diagnostic mode is the fractional "on" time of each zone as a function of outdoor temperature and the average heating supply water temperature of the boiler over time (or in more detailed implementation the average heating supply water temperature of the boiler during specific intervals of outdoor temperature). During this diagnostic period the intent is that the controls of the existing heating system to which the addition of heat pump is contemplated would be adjusted such that all room thermostats are set to constant (or "hold") temperature setting and the existing boiler would be preferentially set at constant output temperature, with as little operating differential as the existing boiler control will allow. Any "reset" boiler control that adjusts the boiler water temperature to changes in the outdoor temperature would be preferentially bypassed or overridden. These temporary system adjustments provide for characterization of the heat dissipation and heat demand characteristics of the different heating zones and would only minimally impact occupant comfort during the diagnostic period. As a practical matter, it is preferred that operating behavior of the zones be recorded for ranges of outdoor temperature rather than t at each degree increment of temperature. For example, such recording and evaluation of operating behavior, (i.e. fractional "on-time") in ranges (or bins) of outdoor temperature such as 70 F to 65 F, 65 F to 60 F, 60 F to 55 F, and so on down to about −10 F would be a practical implementation. Once this operating characteristic is established over a period of time, likely several days to several weeks, and preferably during cold weather conditions when substantial heating is required, the data can then be used to determine the lowest temperature at which the heat dissipation system in each zone can maintain adequate heat delivery with the reduced heat supply temperature that is available with the heat pump.

For example as how this determination can be made, if in the diagnostic mode of operation, Zone A is found to operate a fractional "on-time" of 0.5 while outdoor temperature ranges from of 10 of 20 F with the boiler supplying 180 F water, and that ratio of heat delivery for the heat dissipator at 180 F supply water temperature is known (from manufacturer's performance charts, as typically shown in FIG. 2) to be twice that at a 140 F supply water temperature, then calculation would indicate that a fractional "on-time" of 1.0 (or 100% "on-time") would be required for a heat pump with a 140 F heating supply water temperature capability at the 10 to 20 F outdoor temperature range. The same data would also indicate that, at temperatures below the 10 F outdoor temperature, Zone A would likely need to use the boiler as a source of heating to meet the heating demand, as heating demand increases with decreasing outdoor temperature. Above an outdoor temperature of about 15 F, the heat pump alone, if properly sized, should be capable of meeting all heating demands as the required fractional "on-time" of the zone at such higher outdoor temperatures would be less than 1.0. This determination of the potential role of a heat pump, with its more limited water heating temperature, can be made for each zone while the controller 108 is operating in the diagnostic mode. From this complete set of data, the following can be established in support of the subsequent installation of a heat pump in combination with a fuel-fired boiler:

1) The minimum outdoor temperature at which the heat pump alone can meet the heating load in each zone and thus the control settings necessary for the controller to switch, during operation of the combined heating system, from the heat pump to the boiler in order to maintain thermal comfort with the heat dissipation devices existing in each zone;

2) The variation of this minimum ambient temperature (with heat pump function alone) among the zones;

3) The preferred mechanical flow arrangement of the heat pump and boiler with regard to the multiple zones (see discussion below); and 4) Identification of the zones where addition of heat dissipation devices will be most beneficial in terms of achieving the desired annual operating objectives such as maximum utilization of the heat pump for heating (i.e., lowest use of on-site fossil fuel) or achieving lowest annual operating cost.

B. Exemplary Operation of Diagnostic Mode and Application of Diagnostic Results

FIG. 2 is chart 200 showing an illustrative example of the output of the controller 108 when applied for a diagnostic period in a system having four zones (Zone 1-Zone 4). Each number in the chart 200 is the fractional amount of time that, at the indicated outdoor temperature range (or bin), the zone is activated by the thermostat and delivering heat. The result 1.0 represents continuous operation (i.e. a continuous demand for heat by the thermostat). The result of 0.5, for example, means that, for that temperature bin, the demand for heat by the thermostat would be 50% of the time. In the example of the chart 200, the occurrence of the number 1.0 in Zone 4 bin for 0 to −10 F outdoor temperature bin indicates that the zone heating requirement is not likely adequately met since at the adjoining temperature bin (0 to 10 F), which is higher outdoor temperature range, is also at 1.0. This table would be constructed for temperature bins that encompass the lowest expected outdoor temperature at the geographical site of the building and heating system. For illustrative purposes, the temperature bin size is shown, for example, as 10 Fahrenheit degrees. Smaller bin sizes, such as 5 Fahrenheit degrees might also be used for better resolution.

For illustrative purposes, the information in the chart 200 of FIG. 2 can be interpreted by the installer of the heat pump system to be used in combination with an existing boiler, as discussed in the following paragraph, assuming the diagnostic test has been performed, for example, with (a) a fixed 180 boiler water temperature set point, (b) the allowable maximum set point water delivery temperature for the heat pump is 140 F, and (c) the operating characteristic of the heat dissipation devices follow a known performance characteristic as typically shown in the graph 300 of FIG. 3. Operating characteristics of heat dissipation devices (i.e. heat delivery capacity as a function of supply water temperature), such as finned baseboard, convection heaters, and panel heaters can typically be obtained from the literature of the manufacturers.

Figure 3:
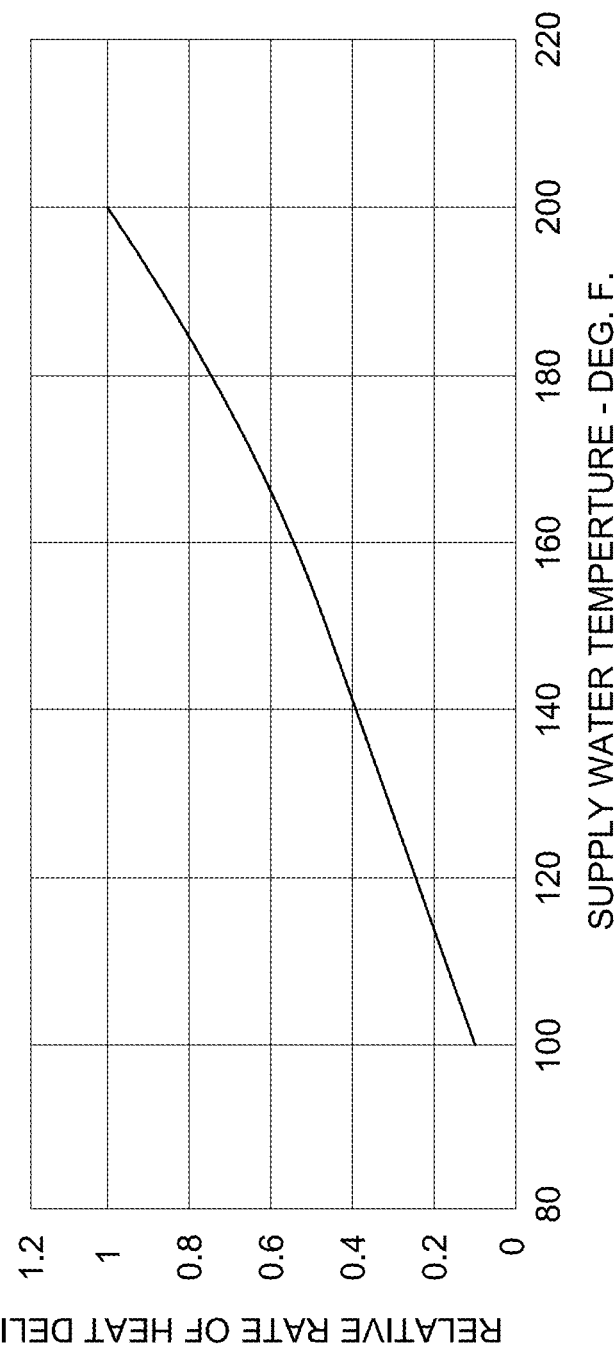
FIG. 3 is a graph showing a curve of fractional "on-time" output from operation of diagnostic mode by the controller of FIG. 1.

From the typical heat dissipation unit performance graph 300 of FIG. 3, the relative heat dissipation rates at 140 F, the heat pump limit, and 180 F, the diagnostic test condition, is 0.4/0.75 or 0.53. This means the a "radiator" operating at 140 F can dissipate heat into the room at a rate that is 53% the heat dissipation rate of the same "radiator" operating at 180 F. This ratio can be then used to calculate "corrections" that would need to occur to the fractional "on-time" results of FIG. 2, if the heating system were to operate at 140 F, with the heat pump, rather than 180 F as supplied by the boiler during the diagnostic test, and the same amount of heat energy were to be supplied, over time, to each zone to maintain thermal comfort conditions. The correction factor for the fractional "on-time", in this example, is 1.0/0.53 or 1.88. This interpretation of this number is that any zone would need to be activated to supply heat for a time 88% longer when using the heat pump compared to using the boiler. Applying this "correction factor" to the actual recorded fractional "on-times" of FIG. 2 yields the predicted fractional "on-times" of Figure of 4 for operation with the heat pump. In the exemplary chart 400 of FIG. 4, all zone and temperature interval bins with a predicted fraction "on-time" greater than 1.0 cannot be adequately heated by the heat pump alone. Thus, as an illustrative example, from the depicted results of the chart 400 of FIG. 4, the system designer and installer would be able to make the following design judgements using the results of the operation of the controller 108 during the diagnostic period of operation:

1) All zones can be heated with the heat pump down to an outdoor temperature in the range of 20 F to 30 F. Thus 25 F would be a candidate outdoor temperature switch-over point between heat pump operation and boiler operation in a mechanical system configuration where all heating zones are simultaneously, and not independently, switched between being supplied with heated water by the heat pump and the boiler; and 2) Only one zone, Zone 3, if so desired, can be heated, if so mechanically configured, only with the heat pump to the lowest expected outdoor temperature. This zone would be a candidate for a piping arrangement that allows this zone to operate with the heat pump at all times.

Design judgment/conclusion (1) above with regard to switch-over temperature may also provide for a good estimation of the total heating energy that can be supplied by the heat pump, over the heating season, compared to the boiler. In contemplating the application of a heat pump in combination with a boiler, the addition of the heat pump can be a significant expense and having the ability to estimate how much of the annual heat load can be handled by the heat pump is an important consideration in determining total estimated costs and benefits. An outdoor temperature time duration curve for the building location provides the desired additional information and such information is generally available from weather data sources. An example is shown in the graph 500 of FIG. 5.

Figure 5:
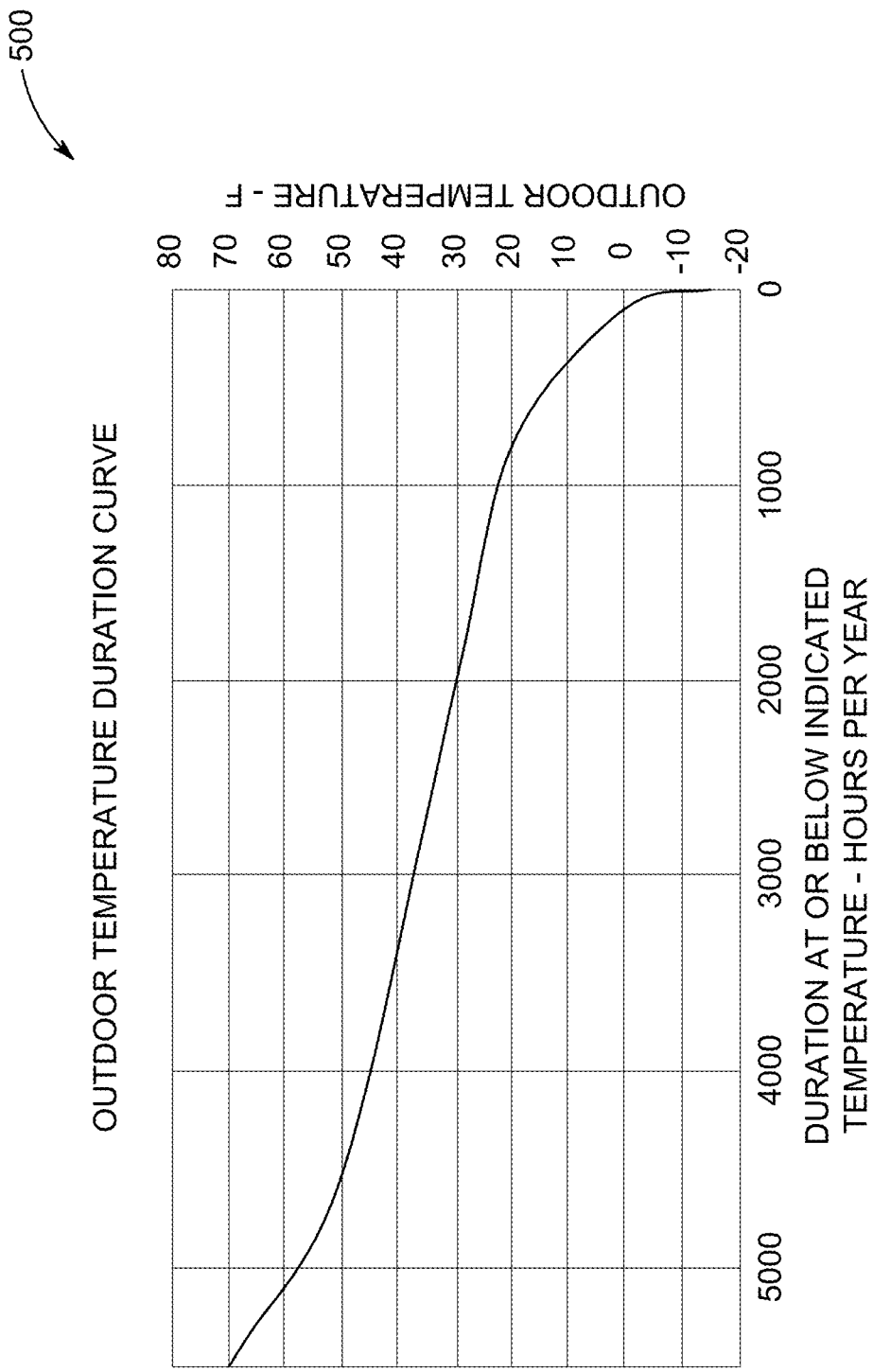
FIG. 5 is a graph showing a curve of illustrative outdoor temperature duration for use in programming the controller of FIG. 1.

With the knowledge that the heating demand for most smaller buildings, such as residences, is approximately proportional to the difference between the indoor temperature and the outdoor temperature, and with the use of the information of the chart of FIG. 5, the illustrative information in the table 600 of FIG. 6 can be computed from information produced in the diagnostic mode of operation. In particular, the chart 600 shows the results of a computation of the annual relative heating energy load on the system as a function of outdoor temperature (or temperature "bins"). Relative annual total heating energy load for the system for each temperature bin is computed by multiplying the relative heat demand rate by the annual time duration of temperatures corresponding to that temperature bin. For this example, for the application of a heat pump with a 140 F limit having predicted heating performance as in the results of the chart 400 of FIG. 4, the summation of the annual heating loads for the temperature bins over which the heat pump alone can meet the full heating demand indicates that approximately 74% of the annual total heating could be met by operation of solely the heat pump. Thus, for this example, with regard to an interest in reducing the fuel use by the boiler, the annual fuel use reduction by the boiler with the addition of the heat pump would be approximately 74%.

Actual data produced by the controller 108 can lead to a wide variety of results with respect to the operation of the zones and the useful application of a heat pump in combination with a boiler. This can include concluding that (a) the heat pump can function to heat all zones at all outdoor temperatures, (b) it can heat all zones down to certain outdoor temperatures, (c) it can heat some zones (suggesting that additional heat dissipation should be added to make a higher performance combined heating system at certain ranges of outdoor temperature, or (s) a variety of other determinations regarding the potential addition of the heat pump's heating contribution to the overall heating system. Included is the possible determination that the heat pump alone may handle the heating load entirely and a backup fuel-fired boiler is not needed.

The data produced by the controller 108 in the diagnostic mode can also be used to estimate the proper size (i.e. rate heating capacity) of the heat pump for addition to a hydronic heating system. This sizing can be deduced by determining the building heat load from the acquired data regarding actual operation of fuel burner of the boiler during the diagnostic period of operation of the controller 108. To determine such building heat load, the controller 180 can receive an input regarding the status and time history of the burner in the boiler that is, the fractional "on-time" duration of the boiler burner. This data with regard to the burner fractional "on-time" and firing rate can be collected for each of the temperature interval bins, with the firing rate most commonly at fixed level which is often labelled on the equipment. With the firing rate of boiler known, and recognizing a good estimate of efficiency is available for different boilers, the actual average heat production rate (and hence actual heating load) for each temperature interval bin is readily calculated. The sizing of the heat pump should then, for example, correspond to the average heating rate of the boiler at the outdoor switch-over temperature interval bin (for systems in which all zones are switched between the boiler and the heat pump at the outdoor switch-over temperature). For applications where different zones are switched between the boiler and the heat pump at different outdoor temperatures, similar procedures for sizing of the heat pump can be applied.

Note that the burner "on-time" data recorded by the controller does not directly provide a representation of the relative heat demand, or fraction of the total heat demand experienced in each separate zone at each temperature internal bin. In the illustrative implementation, it can only provide the total heat load of the building. The fractional on-time data for the several zones also, alone, does not provide this information with regard to the relative heating demand among the different zones, according to the illustrative implementation. This is because all zones operate on independent time schedules dictated by the room thermostat and actual heat dissipation rate in each zone is not known and cannot be determined simply from zone control operational "on-time" data. All that is directly deducible from the data provided in the graph 300 of FIG. 3 is the ability of a particular zone to meet whatever the thermal load happens to be at different supply heating water and outdoor temperatures. However, should load split between the zones be of interest, the data provided by the controller 108 can be used to achieve an approximation of the zone heat loads. This can be accomplished by weighting (i.e., multiplying by) the size of the heat dissipation device in each zone (such as number of feet of baseboard) by the fractional on time, summing those results to determine a number Z. Then, to find the fractional heat load in a specific zone, dividing the operation-time-weighted heat dissipation size number for that zone by sum Z. Since measuring the length of baseboard or heating panels is an easy undertaking, this procedure becomes a practical means of estimating the division of the total heating load among the different zones. This can be useful in deciding how to connect the different zones to the heat pump, estimating the proper size of the heat pump to be added, and determining which zones could be most benefited by modification of the heat dissipation in that zone to increase the performance potential of the heat pump.

All of these procedures/processes can be incorporated into the control software/firmware that is instantiated with respect to the controller 108, so that some or all of these computations are readily performed as part of the diagnostic mode of operation of the controller 108. However, in various embodiments, incorporating all these analysis features into the controller 108 is not required for implementation as worksheets for manual determination of results, such as heat load distribution and optimum temperature for switching from heat pump to boiler operation, would also provide a practical operational approach.

A further feature that can be incorporated into the illustrative controller 108 as part of its diagnostic mode is for the controller to internally monitor the creation of fractional on-time data as shown in the chart 200 of FIG. 2, and thereby make a decision as to when enough data has been recorded to yield an accurate result. This can be accomplished by monitoring the change in the computed fractional "on-time" over time. Once at the bin result for each zone stabilizes within a certain tolerance over a specified length of time, then the controller can identify that adequate data has been obtained for that zone temperature interval bin. Note that the presence of all bin data is not required to achieve a useful result, since missing bin data can typically be extrapolated or interpolated (using well-known mathematical procedures) from good data that has been collected by recognizing that, for any particular zone, the fractional "on-time" should vary among the different temperature bins approximately proportionally to the difference between the outdoor temperature and the desired room temperature.

III. Controller Runtime/Normal Mode

A. Overview

Once the diagnostic period of operation is complete, as determined by the controller's internal logic or manual inspection of the zone fractional on-time temperature bin results, the controller 108 can switch, or be switched manually, to a runtime (normal) control mode of operation. In this mode, the thermostats no longer alone determine the operation of the zones, and both the heat pump and the boiler are enabled for operation. In this mode, operation of the combined heat system including all the heating zones is based on the results of the diagnostic tests and other information input to the controller 108 as previously described. Output signal connections of the controller 108 are configured based on how the heat pump is mechanically configured in combination with the boiler. The information inputs to the controller 108 during normal operation thus include:

1) The status of the thermostats in each zone (a "call" for heat or not);
2) The preferred cross-over temperature point for changing between heat pump operation and boiler operation (with multiple inputs if mechanical (piping) configuration of system allows different cross-over temperature in some or all zones);
3) The outdoor temperature;
4) The efficiency and heating capacity characteristics of heat pump as function of outdoor temperature (if an air source heat pump) and heat delivery temperature and the efficiency characteristics of the boiler with respect to the return water temperature; and
5) If implemented with the controller, heating zone temperature readings and settings regarding room temperature control tolerances for each of the zones and tolerances for application of thermostat set back schedules.

Inputs to the controller 108 for operation in the normal mode can also include actual room temperatures that may be available from separate room temperature sensors deployed with the combined heating system or from so-called communicating digital thermostats that can provide such information. The availability of wireless temperature sensing devices can be of special interest in cases when it desirable to avoid the cost of installing and wiring communicating digital thermostats in each zone. Useful application of the invention is, however, not dependent including the capability to monitor actual room temperatures.

With described inputs, the illustrative controller 108, when enabled for full system control, provides output operating signals to the heating zone controls, the heat pump, and boiler using logic that maintains comfort control with the desired tolerances and achieves the optimum operation of the heat pump and boiler with respect to defined operating objectives which, as previously mentioned, may include, for example, minimum annual cost of operation or minimal use of fuel by the boiler. As typical zone controls operate in a simple "on" or "off" mode and with low voltage (24 VAC) wiring connecting the thermostat to the zone controls, the controller 108 now typically generates low-voltage 24 VAC heat call signals for the operation of the zone valves or pumps, similar to conventional system designs wherein in the thermostats are wired directly to the zone operating controls. With the creation of "calls" for heat to the zones the controller 108 can also provide signals for enabling operation of either the heat pump or the boiler, and again these would typically involve low voltage wiring and signals. The logic in the controller 108 provides the decision making with regard to which heat supply device to operate based on outdoor temperature and other inputs. Different illustrative implementations of the controller 108 can include one or more outputs for operation of primary system flow circulators as needed. More than one primary circulator control output, and additional valve operating signals, are typically desired for mechanical piping and valving situations in which the heat pump is providing heat to some zones while the boiler is providing heat to other zones.

It is noted that the controller can also be adapted to include easily understood, user-friendly "trim" control features that allow for the building occupant to adjust of the control parameters or logic, within limited ranges, in response to building occupant dissatisfaction with performance in maintaining comfort control as can be experienced, with the controller functions achieving operational objectives, such as minimum fuel use by the boiler or lowest operational cost. Such features can be presented on an appropriate graphical user interface (GUI) display and consist of straightforward options or menu choices that can be clicked by the user to achieve an appropriate setting.

B. Exemplary Operation of Normal Mode

Figure 7:
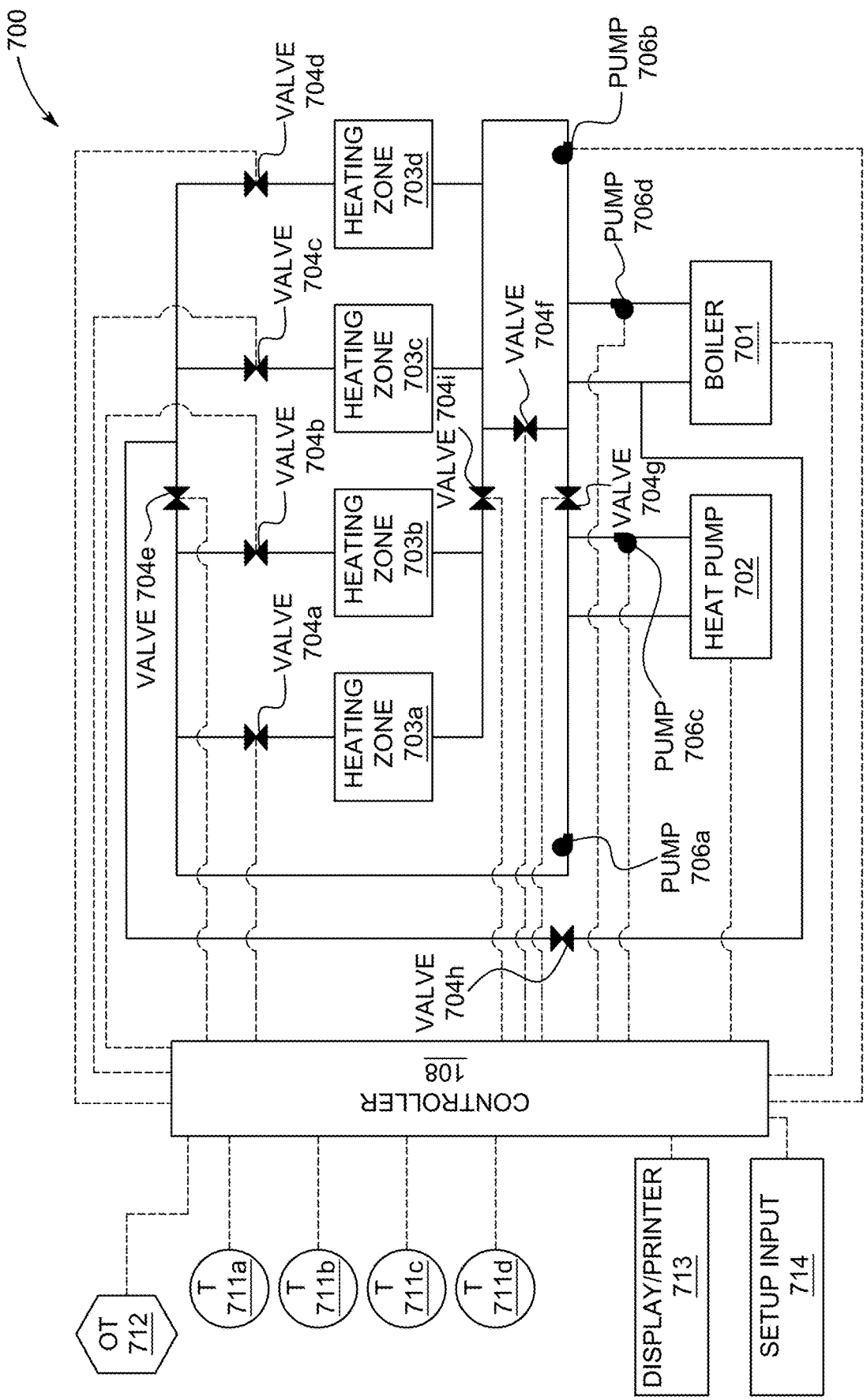
FIG. 7 is a schematic diagram showing an operational example in which the controller of FIG. 1 manages a multi-zone heating system.

An illustrative example of the application of the controller 108 is provided in FIG. 7, which illustrates (by way of non-limiting example) the application to a four-zone combined heat pump and boiler hydronic heating system 700. This exemplary system 700 allows for heating solely with the heat pump, solely with the boiler, and with the heat pump and boiler each separately and simultaneously heating two of the four zones. This illustrative system configuration can apply to case in which two of the zones have sufficient heat dissipation capacity to maintain room temperature with the heat pump at lower outdoor temperatures than the other two zones, but at the coldest outdoor temperatures, the boiler's heat is required to heat all zones. As described above, it is generally impractical to simultaneously use the heat pump and boiler linked in a series or parallel flow arrangement and the arrangement of FIG. 5 thereby allows the fullest utilization of the heat pump. Inputs to the controller 108 are the room thermostats 711a, 711b, 711c and 711d, and the outdoor temperature sensor 712, along with system initial setup inputs 714. The output control signals are to the zone controls 704a, 704b, 7804c and 704d, heat pump 702, boiler 701, and flow configuration valves 704e, 704f, 704g, 704h and 704i, and circulators 706a, 706b, 706c and 706d. During operating conditions in which all the zones can be satisfied with operation of solely the heat pump or solely the boiler, the flow configuration valves would be in the following state: valves 704h and 704f closed and valves 704g, 704i, and 704e open. When it is desirable to operate the heating zones 703a and 703b with the heat pump and zones 703c and 703d with the boiler, the flow configuration valves would be in following state: valves 704h and 704f open and valves 704g, 704i, and 704e closed. Pump 706c would be operated by the controller 108 any time there is a call to operate the heat pump 702 and pump 706d would be operated any time there is call for the boiler 701 to operate. Either pump 706a or 706b, or both, would be controlled to operate when there is sole operation of the heat pump 102 or the boiler 701. Both of these pumps would operate when the controller 108 calls for simultaneous operation of the heat pump 702 to support zones 703a and 703b and the boiler 701 to support heating zones 703c and 703d. An interface to a display/printer 713 is also provided along with setup input information 714, as shown.

Included in the logic of the controller 108 can be procedures to maximize the use of the heat pump in the presence of thermostat setback schedules while still ensuring satisfactory comfort control in the different zones. This logic is in addition to the logic described above regarding the determination of the outdoor temperature switch-over set points that can be assigned to the system or automatically deduced by the controller 108 for the system operation (as a result of operating in the diagnostic mode). Additional logic of this type can allow the heat pump to contribute heat energy for heating even during periods when outdoor temperature is below that at which the heat pump could not fully sustain a non-setback room temperature condition. Customary use of nighttime or daytime thermostat setback can save energy use, but usually results in intense periods of operation of the heating unit during the "recovery" period from the setback period. The controller 108 can operate in the following manner in order to avoid unnecessary use of the boiler and to achieve maximum operation of the heat pump with zones that have temperature set back schedules. First, over time the controller 108, while used in the active control mode of operation, can learn of the setback and recovery periods by monitoring the heat demand of the thermostat in each zone over a 24-hour period and 7-day week. The controller 108 can record that there are long periods of no call for heat in spite of the outdoor temperatures that would normally cause thermostat demand for heat. The controller 108 can then respond in a number of different ways to minimize the use of the boiler as a result of setback recovery and maximize the use of the heat pump during such set back periods such as the following:

1) The controller 108 can be programmed to operate the heat pump during the recorded set back periods while recognizing that the heat pump alone, would not have the capability to sustain normal (non-setback) thermostat demands at the prevailing outdoor temperature but may well have capability to sustain the setback temperature setting at the prevailing outdoor temperature;

2) The controller 108 can be programmed to operate the heat pump in anticipation of the end of the setback period as to minimize the use of the boiler to supply the heating energy needed to recover from thermostat setback (i.e. avoid the need for high heating output of boiler to achieve quick recovery from setback.); and 3) The controller 108 can monitor the length of the continuous call for heat during the recover from setback at all outdoor temperature conditions, and, if the call for heat is excessively long, could override the normal call for heat pump operation at the current outdoor temperature and switch to the boiler for more rapid room temperature recovery.

The controller 108 is also adapted to include feedback of actual room temperatures to the controller. This may be accomplished with so-called digital communicating thermostats or with temperature sensors, wireless or wired, independent of the room thermostats. Use of wireless temperature sensors to provide actual room temperature feedback to the controller 108 have the practical benefit of not requiring replacement of the conventional thermostats with digital communicating thermostats and the installation of new thermostat wiring that such thermostats require. If room-located temperature sensors are used with the controller 108, and such temperature information is used in control logic of the controller 108, then it can be used, for example, to further expand the envelope of operation of heat pump by allowing more precise coordination of the heat pump operation during setback periods and allow small overshoots in room temperature that can facilitate more continuous operation of the heat pump and better accommodate equipment minimum run times as may be required.

In some circumstances, the control logic can include override functionality adapted to override normal runtime (or other) controller operations. These operations are normally arranged to optimize efficiency in various ways (e.g. fuel consumption efficiency, reduced carbon emissions, etc.). However, in certain "special circumstances", override can also initiated by the controller logic—for example, in the case of electrical grid outages (which would cause the heat pump to cease operating), or where limited, or no, fuel is available for the boiler.

IV. Conclusion

It should be clear, as described above, that the controller 108 can enable the application of a variety of control logics that make maximum use of the heat pump, or achieve other operating objectives, for such a combined heating system all the while meeting the room comfort control needs with capability of the existing heat dissipation devices in the different heat zones and while also operating the heat pump within its operating temperature limits. The above is one illustrative example of how the illustrative controller 108 can be deployed and there are many variations in its specific configuration and programming logic that fall within the scope of the controller. The controller 108 includes any logic for actual operation of heating zones wherein such logic is (a) based on use of the controller to evaluate, in a diagnostic mode of operation, the relative heating capability of the heat dissipation devices in the several zones and (b) can be based on the input of equipment operating characteristics (manual) and data collected by the controller (automatic), such as current operating temperatures within the combined heating system equipment or within the heated zones.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, the terms "process" and/or "processor" should be taken broadly to include a variety of electronic hardware and/or software-based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. An electronic controller for the operation of a building space and domestic water heating system employing the circulation of a heated liquid, the system having different heat supply sources with different liquid temperature operating limits and heating capacities and thermostatically-controlled heat delivery zones containing heat delivery devices having a heat output dependent on the liquid temperature, the controller configured to execute:
   (a) a diagnostic process to record and analyze, over time, an operating history of the thermostatic controls of each of the heat delivery zones of the heating system to determine and record the fractional time of active heat demand of the thermostat in each of the zones at specific outdoor temperatures, over a range of outdoor temperatures, at a specific heated liquid temperature,
   (b) a runtime process that executes the overall operational control of the heating system in the satisfaction of heating demands of the heat delivery zones within the different liquid operating temperature limits and heating capacities of the heat sources wherein
      i) the capacity of a heating zone to meet the heating load, at a specific heating supply water temperature and outdoor temperature, is established by combining the prior measurement of the fractional time of active heat demand of the thermostat in each of the zones at specific outdoor temperatures, over a range of outdoor temperatures, at a specific heated liquid temperature together with the known general knowledge of the relative heating supply capacity, as a function of temperature, of the type of heating devices contained in each zone, and
      i) the operational control achieves substantially minimum fuel use or substantially minimum cost of operation while maintaining the thermostat set point temperatures in each of the heating zones by selectively switching among the different heat supply sources having different liquid temperature limits to enable operation of the thermostatically controlled heat delivery zones, singly or collectively, in a manner that meets, for all expected outdoor temperatures, said established, required heating supply liquid temperature for each of the zones.

2. The electronic controller of claim 1 wherein the controller includes a process to determine when enough operating data has been recorded during a diagnostic period to allow for efficient operation of heating system in a normal runtime mode to meet operational objectives.

3. An electronic controller for the operation of a combined heating system that includes a heat pump and a boiler for building-space and domestic-water heating that has one or more thermostatically-controlled heating zones being supplied with heated liquid and containing heat delivery devices, the electronic controller configured to execute:
   (a) a diagnostic process to record and analyze, over time, an operating history of the thermostatic controls of each of the heat delivery zones of the heating system to determine and record the fractional time of active heat demand of the thermostat in each of the zones at specific outdoor temperatures, over a range of outdoor temperatures, at a specific heated liquid temperature, (b) a runtime process that executes the overall operational control of the heating system in the satisfaction of heating demands of the heat delivery zones within the different liquid operating temperature limits and heating capacities of the heat sources wherein i) the capacity of a heating zone to meet the heating load, at a specific heating supply water temperature and outdoor temperature, is established by combining the prior measurement of the fractional time of active heat demand of the thermostat in each of the zones at specific outdoor temperatures, over a range of outdoor temperatures, at a specific heated liquid temperature together with the known general knowledge of the relative heating supply capacity, as a function of temperature, of the type of heating devices contained in each zone, and ii) the operational control achieves substantially minimum fuel use or substantially minimum cost of operation while maintaining the thermostat set point temperatures in each of the heating zones by selectively switching between the boiler and the heat pump to enable operation of the thermostatically controlled heat delivery zones, singly or collectively, in a manner that meets, for all expected outdoor temperatures, said established, required heating supply liquid temperature for each of the zones.

4. The electronic controller of claim 3 wherein the combined heating system includes a boiler that is a fuel-fired water heating boiler or an electric resistance heating boiler.

5. The electronic controller of claim 3 wherein the combined heating system includes a heat pump or heat pumps that are powered by either heat or electricity and use environmental heat energy from the ground, local water supplies, or air, and further comprising a thermal storage buffer tank to facilitate operation of the heat pump.

6. The electronic controller of claim 3 wherein an input signal to the controller includes outdoor temperature, provided either by direct measurement or communication with a weather data provider.

7. The electronic controller of claim 3 wherein the controller is constructed and arranged to (a) signal at least one of the heat pump or the boiler to operate to produce heat at a specific level of heat output, and to (b) signal operation of any pump or motorized valve associated directly with the flow of fluid in either the heat pump or the boiler.

8. The electronic controller of claim 3 wherein an information input to the controller includes the operating set point temperature of the boiler and a maximum operating outlet temperature of the heat pump.

9. The electronic controller of claim 3 wherein a data input to the controller includes at least one of (a) a continuous input of the output, input, or both output and input water temperatures of the heat pump, and (b) an output, input, or both output and input, water temperature of the boiler.

10. The electronic controller of claim 3, further comprising control output features that are adapted to operate the combined heating system in which the heat pump and the boiler are configured in series flow arrangement or parallel flow arrangement with respect to a primary circuit of heated liquid supply and return piping that collectively services the thermostatically controlled heating zones.

11. The electronic controller of claim 3 wherein, based on the recorded and analyzed operating history of the thermostats in one or more heating zones, the controller is adapted to output at least one of (a) a desired operating set point temperature and (b) an operating command to at least one of the heat pump and the boiler to maximize operating energy efficiency of the combined heating system.

12. The electronic controller of claim 3 wherein the controller is adapted to monitor temperatures present in the heating zones so as to make adjustments to operating schedules of the heat pump, boiler, and heating zones so as to achieve the desired operating set point temperature of the room thermostat, wherein operation of the boiler is substantially minimized and operation of the heat pump is substantially maximized, and whereby at least one of operational cost and carbon emissions are substantially minimized.

13. The electronic controller of claim 3 wherein the controller is adapted to use recorded operating history of the heating zones to determine periods of thermostat set-back and to facilitate operation of the heat pump so as to minimize the use of the boiler and maximize the use of the heat pump during the operation of the heating system to recover zone room temperatures to a normal, and higher and non-setback, temperature.

14. The electronic controller of claim 3 where the controller is adapted to output information that includes at least one of a printed output and a displayed output, that provides information related to at least one of (a) operating history of the heating zones, (b) sizing or performance of the heat dissipation devices in each zone, (c) operating history of the heat pump and the boiler, and (d) a current operational status of the combined heating system.

15. The electronic controller of claim 3 wherein the controller is adapted to display, on an interface, easily understood, user-friendly trim control features that allow for the building occupant to adjust the control parameters or logic, within limited ranges, in response to building occupant dissatisfaction with performance of the heating system to maintain the desired room temperature.

16. The electronic controller of claim 3 where the controller is adapted to interoperate with either conventional, on-off room thermostats or electronic digital communicating thermostats.

17. The electronic controller of claim 3 wherein the controller is adapted to interoperate with heating zones using either valves or pumps for heating fluid flow control.

18. The electronic controller of claim 3 wherein the controller includes a process to determine when enough operating data has been recorded during a diagnostic period to allow for effective operation of both the boiler and the heat pump in a normal runtime mode to meet operational objectives.

19. The electronic controller of claim 3, further comprising a manual, automatic, or remote-operated override to controller operating processes that optimize operation of the combined heating system to allow for response to special circumstances.

20. The electronic controller of claim 3 wherein the controller is adapted to record an operating history of the boiler, when used as the sole source of heating, so as to allow evaluation and estimation of appropriate sizing of a heat pump to be added, or used in combination with, with the boiler to meet demands of the combined heating system.

21. A method of measuring the behavior, over time, of a thermostat in a single heating zone, or thermostats in multiple heating zones, of a circulated-hot-water type of space and domestic water heating system containing heat sources with different supply water operating temperatures, comprising the steps of:

(a) determining, over a range of outdoor temperatures and at a known heating system supply water temperature, heat delivery capacity in each of the heating zones relative to a thermal load in each of the zones, respectively, wherein a measured fractional time of active heat demand by the thermostat in each of the zone, respectively, is interpreted as the capacity of a zone to meet the heating load at the known heating system supply water temperature at the current outdoor temperature; and
(b) in response to the step of determining, predicting zone operating behavior at other supply heating water and outdoor temperature conditions, whereby scheduling of the use of the different heat sources having different operating temperature limits and heating capability is established to achieve desired operational objectives, including at least one of minimum fuel use, or minimum cost.

\* \* \* \* \*

UNITED STATES PATENT AND TRADEMARK OFFICE
CERTIFICATE OF CORRECTION

| | |
|---|---|
| PATENT NO. | : 11,193,691 B1 |
| APPLICATION NO. | : 16/811053 |
| DATED | : December 7, 2021 |
| INVENTOR(S) | : Eric C. Guyer and Mark J. Macaulay |

It is certified that error appears in the above-identified patent and that said Letters Patent is hereby corrected as shown below:

On the Title Page

Item (71) delete:
"(71) Applicant: Yankee Scientific, Inc., Medfield, MA (US)"
And insert:
--(71) Applicant: Eric C. Guyer, Dover, MA (US); Mark J. Macaulay, Northborough, MA (US)--

Signed and Sealed this
First Day of October, 2024

Katherine Kelly Vidal
*Director of the United States Patent and Trademark Office*